United States Patent [19]

Flowers

[11] Patent Number: 5,380,141

[45] Date of Patent: Jan. 10, 1995

[54] PLATFORM AND METHOD FOR LIFTING AND TRANSPORTING VEHICLES

[75] Inventor: Gary Flowers, Litchfield, Minn.

[73] Assignee: Custom Products of Litchfield, Litchfield, Minn.

[21] Appl. No.: 31,170

[22] Filed: Mar. 12, 1993

[51] Int. Cl.⁶ .................... B60P 1/44; B60P 3/06
[52] U.S. Cl. ..................... 414/462; 414/786; 414/480; 224/310
[58] Field of Search ............ 414/477, 478, 480, 462, 414/522, 537, 538, 571, 678, 465, 786; 224/310; 14/71.3

[56] References Cited

U.S. PATENT DOCUMENTS

| | | |
|---|---|---|
| 3,458,073 | 7/1969 | Dawson . |
| 3,613,920 | 10/1971 | Flamm . |
| 3,687,314 | 8/1972 | Haugland . |
| 3,704,794 | 12/1972 | Flamm . |
| 3,720,335 | 3/1973 | Ward . |
| 3,726,423 | 4/1973 | Miron . |
| 3,737,058 | 6/1973 | Johnson . |
| 3,757,972 | 9/1973 | Martin . |
| 3,768,673 | 10/1973 | Nydam et al. . |
| 3,777,921 | 12/1973 | Nelson . |
| 3,902,613 | 9/1975 | Newland . |
| 3,927,779 | 12/1975 | Johnson ................. 414/462 |
| 3,972,433 | 8/1976 | Reed ..................... 414/462 |
| 4,222,698 | 9/1980 | Boelter . |
| 4,234,285 | 11/1980 | Martinez ................. 414/462 |
| 4,239,438 | 12/1980 | Everson ................. 414/538 X |
| 4,274,788 | 6/1981 | Sutton ................... 414/538 X |
| 4,655,671 | 4/1987 | Pratt . |
| 4,685,857 | 8/1987 | Goeser et al. . |
| 4,874,284 | 10/1989 | New, Jr. . |
| 4,954,038 | 9/1990 | Sheahan . |
| 4,960,356 | 10/1990 | Wrenn . |
| 5,110,250 | 5/1992 | Kuo . |

FOREIGN PATENT DOCUMENTS

| | | | |
|---|---|---|---|
| 3025746 | 1/1982 | Germany ............ | 224/310 |
| 8004228 | 2/1981 | Netherlands ......... | 224/310 |

*Primary Examiner*—Michael S. Huppert
*Assistant Examiner*—Stephen Gordon
*Attorney, Agent, or Firm*—Fredrikson & Byron

[57] ABSTRACT

The invention provides a system and a method for lifting and transporting vehicles, such as a snowmobile or other recreational vehicle. The system includes a frame member having a first rail member and attached to a vehicle, a second rail member moveable along the first rail member into a deployment position wherein it extends rearwardly of the frame, a moveable support member which can extend supportively between the second rail member and the ground, and a platform member slidable along the first and second rail members. The method of the invention may employ a system of the invention and involves moving a second rail member into a deployment position extending rearwardly of a frame, moving a support member into position to support the second rail member, sliding a platform rearwardly along first and second rail members to position the platform generally rearwardly of the transport vehicle, and lowering the rearward end of the second rail member to position its rearward end adjacent the ground for loading the vehicle onto the platform.

10 Claims, 7 Drawing Sheets

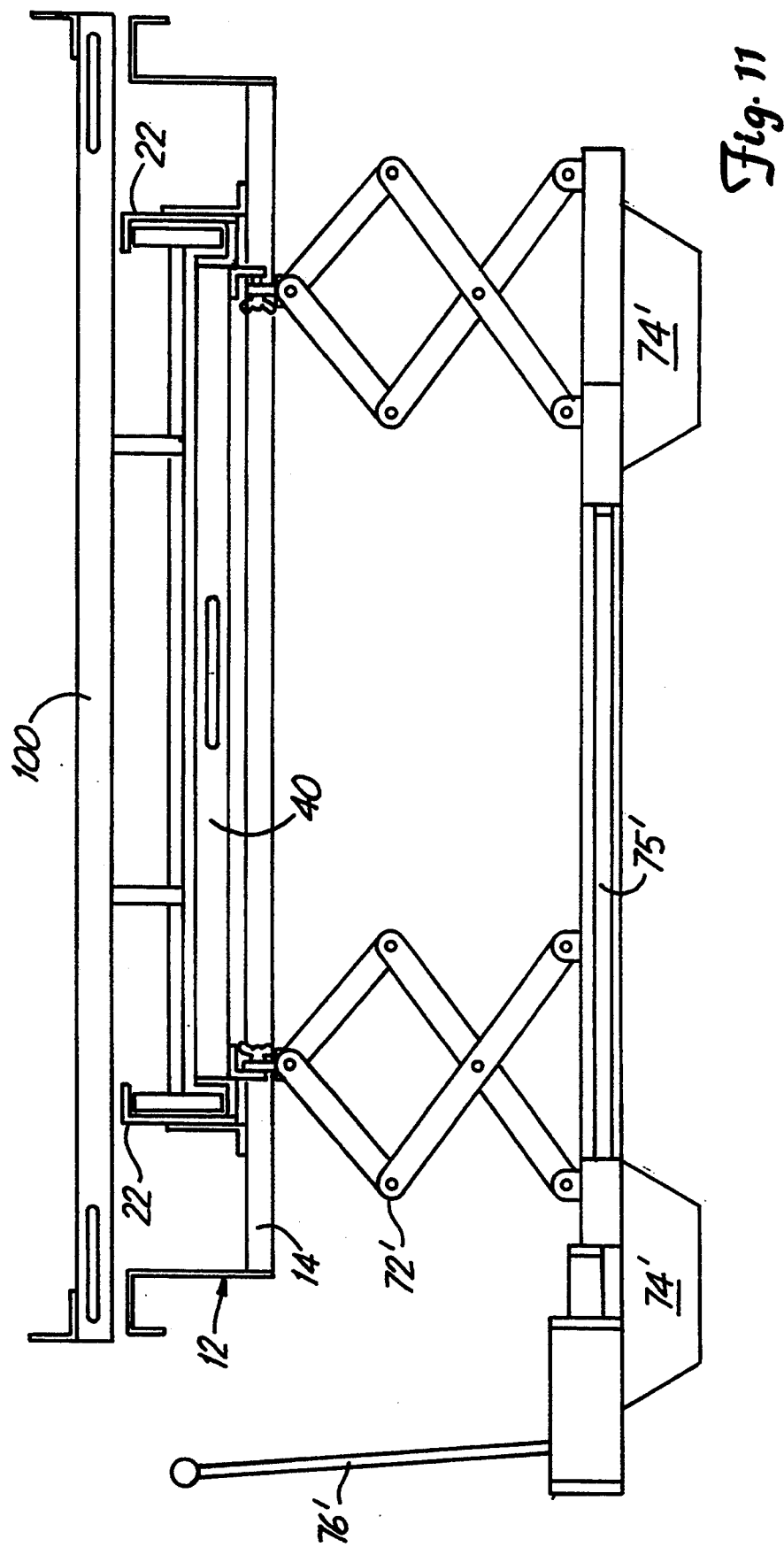

PLATFORM AND METHOD FOR LIFTING AND TRANSPORTING VEHICLES

FIELD OF THE INVENTION

The present invention generally relates to mechanisms for loading and transporting articles, and is particularly useful for loading and transporting recreational vehicles, such as snowmobiles and personal watercraft.

BACKGROUND OF THE INVENTION

Recreational vehicles, e.g. snowmobiles or personal watercraft, frequently must be transported from one site to another. When transporting recreational vehicles, it is common to carry them on a bed of a utility vehicle, e.g. in the bed of a "pickup" truck or on a trailer. For particularly light vehicles, one may be able to simply lift the vehicle to place it on the bed. Most recreational vehicles, though, are too heavy and cumbersome to be readily lifted by hand.

Many devices have been developed for getting recreational vehicles onto the bed of another vehicle. One very simple device for this purpose may be a simple ramp leading from ground level to the level of the bed. Using such ramps can be somewhat dangerous, though. For instance, when placing a snowmobile on the bed of a pickup truck, the operator will usually orient the snowmobile toward the ramp and drive the snowmobile up the ramp onto the bed. It can be difficult to open the throttle just enough to get the vehicle onto the bed without continuing past the desired location on the bed. If the operator opens the throttle too far or for too long, the snowmobile may well collide with a wall at the forward end of the bed of a pickup truck, damaging both the snowmobile and the truck.

One other disadvantage of ramps is that many types of recreational vehicles cannot be steered, or perhaps even propelled, up ramps. Snowmobiles, for example, are steered via their skis and require snow that the skis can dig into to change the direction of the vehicle. In order to load a snowmobile on a vehicle using a ramp, the snowmobile must be properly aligned with the ramp before loading because the skis cannot steer the machine on the relatively smooth surface of a ramp. This problem is even more acute with personal watercraft because they not only are not steerable out of the water, they also require water for propulsion. Accordingly, one must generally either launch the vehicle out of the water so that momentum will carry it up a ramp or use a winch to drag the vehicle up the ramp.

Others have proposed somewhat more complex devices for loading a recreational vehicle on a bed of a transport vehicle. For example, in U.S. Pat. No. 3,704,794, Flamm teaches a frame which is installed on a Bed of a pickup truck. The frame includes a lip at its rearward end for releasably engaging a ramp which extends down to the ground. As with other ramp-based systems, though, there is the risk that the operator will not stop the vehicle at the proper location and the vehicle can collide with the back of the cab of the pickup truck or other transport vehicle.

In U.S. Pat. No. 3,687,314, Haugland suggests a modification of the ramp idea. In accordance with Haugland's disclosure, the vehicle is driven onto a ramp, but is stopped shy of the end of the ramp. The operator is then supposed to manually lift the ramp and the vehicle up to the level of the bed and then slide the ramp along the bed to stow the vehicle. This device may work if the recreational vehicle is relatively light and if there is only one vehicle on the ramp. Even a single, relatively light vehicle may be too heavy for some individuals to lift unaided, though. Furthermore, this device is limited to storing recreational vehicles at relatively low heights; lifting the vehicle substantially above the level of the operator's waist could be very difficult for many people.

The problems associated with manually lifting Haugland's ramp are further compounded by the fact that many recreational vehicles are not loaded on perfectly level, firm ground. In the case of snowmobiles, the vehicles are commonly unloaded onto snowy, and perhaps icy, ground; watercraft would presumably be loaded while the operator is standing in a body of water, such as on a marshy lakebed. Not only would uneven, slippery terrain make lifting more difficult, it may make the device unsafe in that the operator could slip under the ramp while trying to lift it, allowing the full weight of the ramp and the recreational vehicle to fall on the operator.

Nydam et al. set forth a similar device in U.S. Pat. No. 3,768,673, but the ramp is designed to be positioned above the floor of the truck's bed when horizontally disposed in the truck for transport. As with Haugland's teachings, though, there are no supports or mechanical aids for lifting the materials being transported. Much like Haugland's device, it would be rather difficult for an avenge person to lift a heavier recreational vehicle, much less two or more such vehicles, to such a height.

Wrenn teaches a system for loading a personal watercraft onto the bed of a pickup truck in U.S. Pat. No. 4,960,356. In accordance with Wrenn's teachings, a watercraft is placed on the ends of a bendable extension formed of flexible plastic pipe. With the watercraft still in the water, the throttle of the craft is opened to suddenly propel the vehicle into the back of the pickup truck. As the watercraft cannot continue to generate drive once it leaves the water, the vehicle must be given sufficient momentum in a single blast to launch the vehicle into its desired position. This would appear to be very difficult to achieve safely and reproducibly as overpropulsion of the watercraft could easily send the craft crashing into the back of the pickup's cab.

Accordingly, it would be desirable to provide a means for loading and unloading a recreational vehicle onto and off of another vehicle which does not rely on the recreational vehicle's own propulsion to get it into place on the bed of the vehicle. Furthermore, it would be desirable to provide such a device which could allow virtually anyone to lift one or more recreational vehicles onto a bed for transport without requiring any undue strength or work.

SUMMARY OF THE INVENTION

The present invention provides a system and a method which permits one to safely and easily load and unload one or more recreational vehicles onto or off of the bed of another vehicle for storage or transport. In accordance with the invention, a system for loading and unloading recreational vehicles is mounted on a transport vehicle, such as a truck or a trailer.

The system includes a frame which is affixed to the transport vehicle and includes a first rail means, which is desirably oriented lengthwise along opposing sides of a bed of the vehicle. A second rail means cooperates with the first rail means and is movable between a storage position and a deployment position wherein it is disposed rearwardly of the frame. A support means is carried adjacent a rearward end of the second rail means and is movable between a storage position and a support position wherein it extends between the second rail means and the ground to support the second rail means above the ground. A platform means is slidably carried along the first and second rail means and is slidable between a first position wherein it is disposed above the bed of the transport vehicle and a second position wherein it is disposed rearwardly of the bed. The second rail means is desirably pivotally attached to the first rail means, or to the frame adjacent a rearward end of the first rail means, and is pivotable between a substantially horizontal orientation for sliding the platform means and an inclined orientation wherein the second rail means extends from its attachment to the first rail means to its rearward end, which is adjacent the ground.

In accordance with a method of the invention, a system substantially as set forth above is provided on a vehicle. The second rail means is moved to its deployment position wherein it extends generally horizontally rearwardly of the frame. The support means is then moved into its support position so that it extends downwardly from the second rail means to the ground to support the second rail means. The platform means is then slid rearwardly along the first and second rail means to a position wherein the it is disposed generally rearwardly of the vehicle. The rearward end of the second rail means is then lowered so that the second rail means extends between its attachment to the first rail means and the ground. The recreational vehicle or vehicles on the platform means may then be moved rearwardly down the inclined platform to remove the recreational vehicle for use.

BRIEF DESCRIPTION OF THE DRAWINGS

FIG. 11 is a rear view of an alternative embodiment of a system of the invention.

DETAILED DESCRIPTION OF PREFERRED EMBODIMENTS

Figure 1:
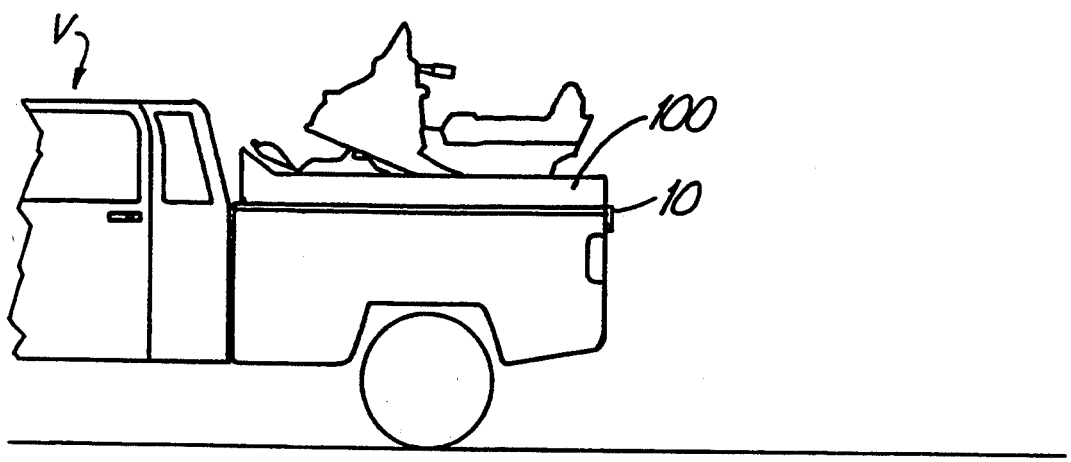
FIGS. 1-4 schematically illustrate how a system of the invention can be used to load and unload recreational vehicles from another vehicle.

FIGS. 1-4 depict a recreational vehicle loading and unloading system of the invention, with the figures schematically illustrating sequential steps in using the system for loading and unloading recreational vehicles. The system of the invention is mounted on a separate vehicle V, such as the pickup truck shown in the drawings. Although a pickup truck is shown in the drawings, it is to be understood that a system of the invention could also be used in connection with a trailer, a flatbed truck or virtually any other vehicle which may be suitable for hauling recreational vehicles.

In general, the system includes a frame 10 (which includes a first rail means 20), a second rail means 40, support means 70, and a platform means 100. The frame 10 is desirably rigidly attached to the body of the vehicle V and is supported by the vehicle. The frame may be mounted directly on the bed of a transport vehicle or, as explained more fully immediately below, it may be mounted on the vehicle at a location disposed generally vertically above the bed.

Figure 5:
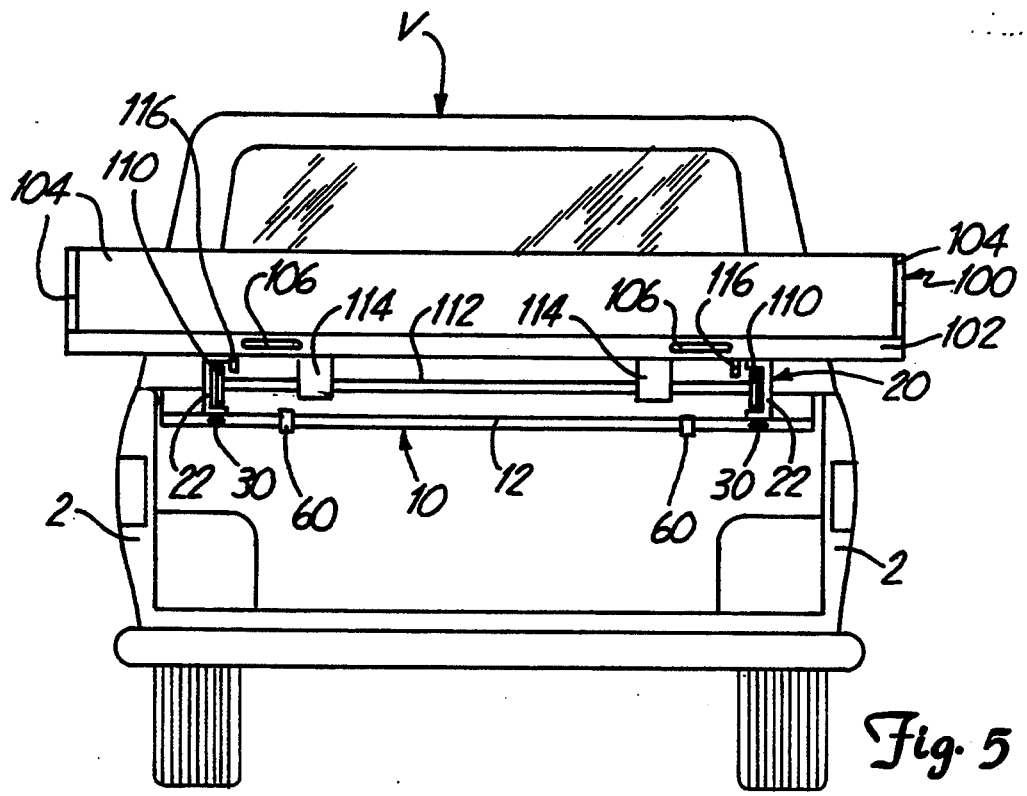
FIG. 5 is a rear view of a system of the invention installed on a pickup truck, wherein the second raft means and support means are omitted for purposes of clarity.
Figure 6:
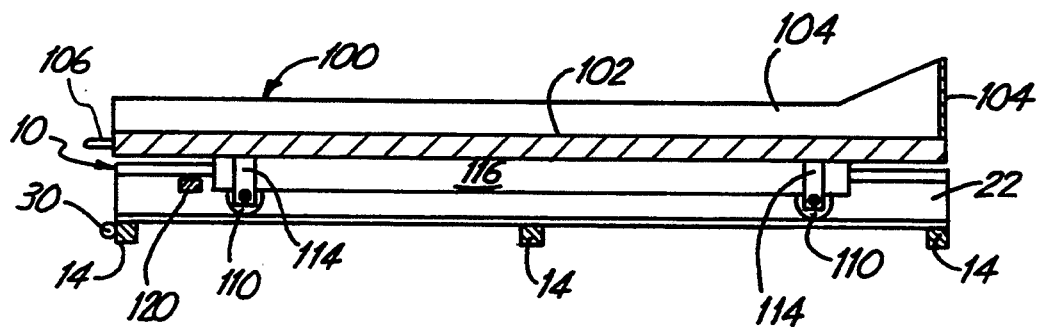
FIG. 6 is a side cross sectional view of the system of FIG. 5.
Figure 7:
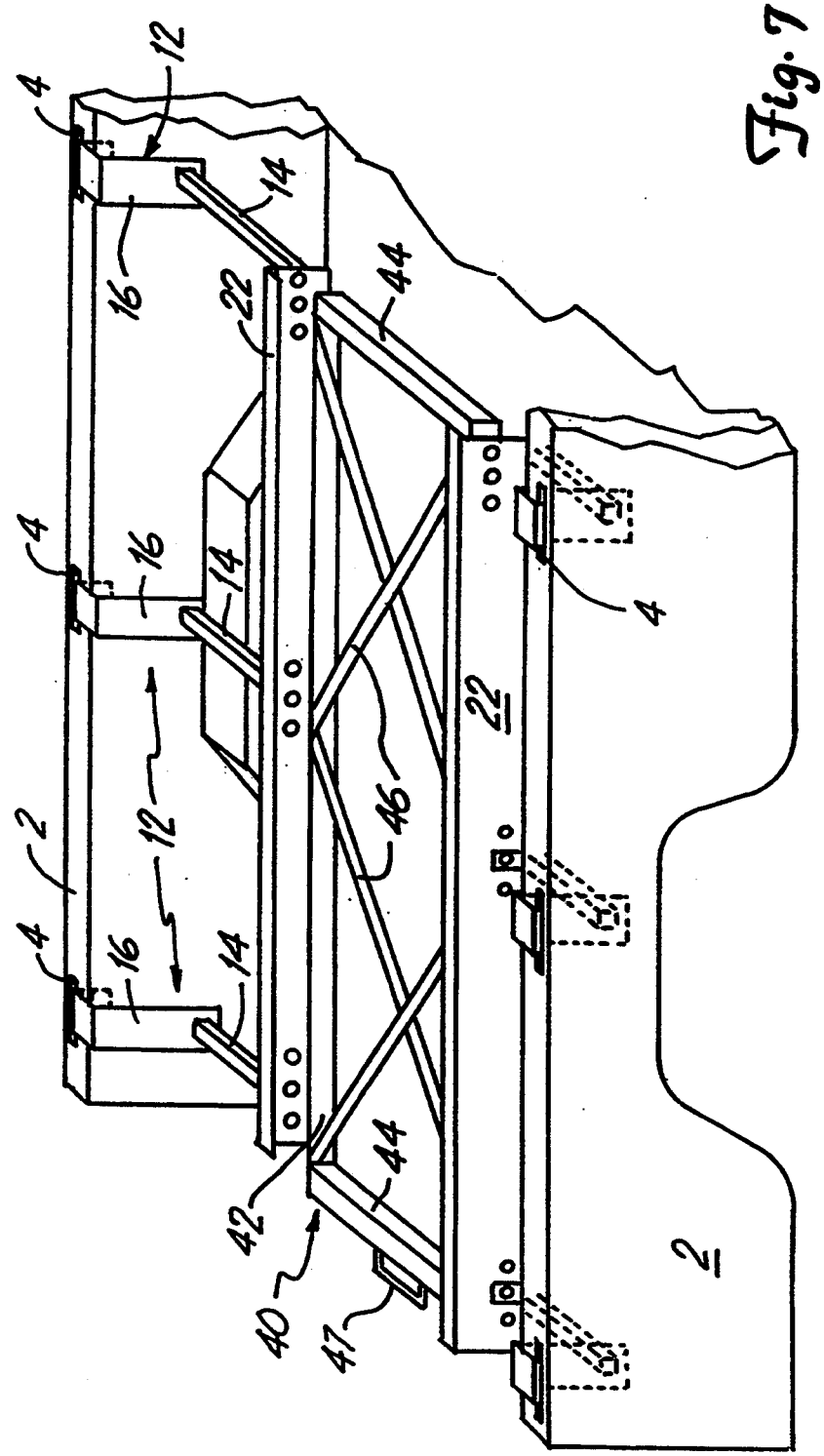
FIG. 7 is a perspective elevational view of the system of FIG. 5 wherein the platform has been omitted for purposes of clarity.

As best seen in FIGS. 5-7, the frame generally comprises a brace 12 for attachment to the vehicle V and a first rail means 20 carried by the brace. If the system is to be used in connection with a pickup truck, as illustrated, the brace is desirably attached to the truck adjacent the tops of the sidewalls 2 of the bed. As explained more fully below, this will permit a wider platform to be used because the platform will not be limited to the width of the bed, but may instead extend laterally beyond the sidewalls, as shown in FIG. 5.

The brace 12 may include a plurality of laterally extending cross bars 14 which extend from one side of the frame to the other. These cross bars may be attached to the vehicle V by any suitable means. The attachment between the brace 12 and the body of the vehicle may be substantially permanent, such as by welding or the like, or the brace may be removably mounted on the vehicle. In the embodiment shown, each cross bar includes an L-shaped mount 16 for attaching the cross bars to the sidewalls of the vehicle's bed. If the frame is to be permanently secured to the vehicle, the mounts may be welded to the sidewall of the vehicle. In a preferred embodiment (best seen in FIG. 7) wherein the frame is removable from the vehicle, the mounts 16 have a downwardly depending flange which can be received m mounting ports 4 provided in the tops of the sidewalls 2 of many models of pickup trucks.

The cross bars 14 are attached to the first rail means 20 and may serve to support the first rail means above the bed of the vehicle V. As detailed below, the first rail means includes a pair of opposed C-shaped brackets 22 which are spaced apart from one another a predetermined distance. Each of the cross bars are attached to both of the C-shaped brackets. The cross bars 14 are also desirably spaced along the length of the brackets 22 to provide good structural support to the rail means 20.

In one embodiment, the cross bars are rigidly attached to the brackets at fixed locations, such as by welding. In the embodiment shown in FIG. 7, though, the position of two of the three cross bars 14 employed in that design are adjustably positioned. The rearmost cross bar is rigidly attached to the first rail means, such as by welding. The other two cross bars are attached to the brackets 22 of the rail means by means of a locking pin assembly. The brackets include two sets of pin-receiving holes, with one set being disposed adjacent the forward end of the brackets and the other set being disposed intermediate the forward and rearward ends. This arrangement permits the relative spacing between the cross bars 14 to be adjusted to accommodate differences in the sizes of the beds of different models of pickup trucks, allowing a single frame 10 to be used with a variety of makes and models of trucks.

Figure 8:
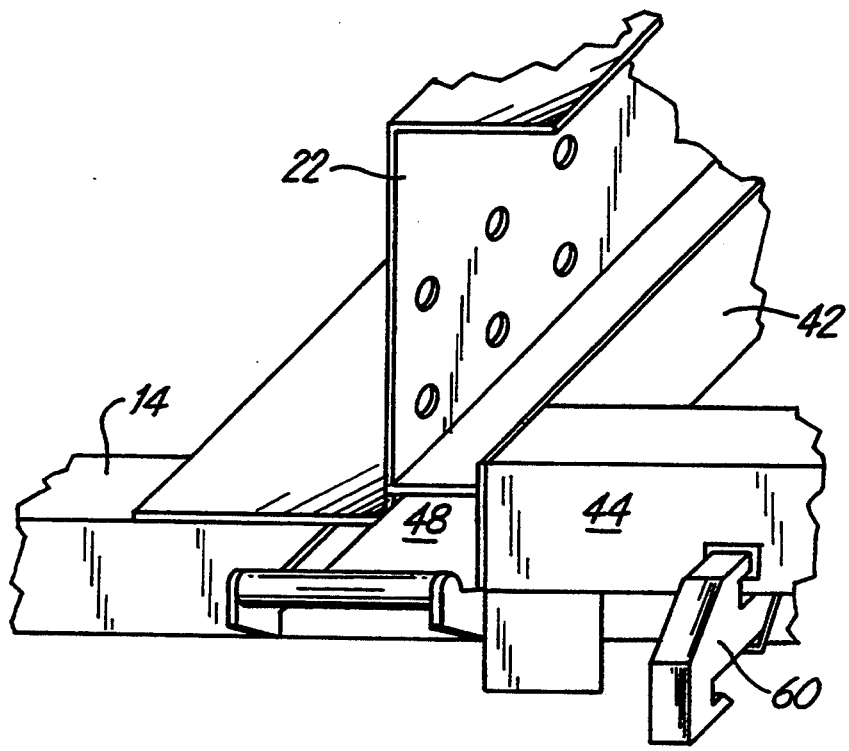
FIG. 8 is a perspective detail view of the system of FIG. 5 illustrating the relationship of the first and second rail me, and when the second rail means is in its storage position.
Figure 9:
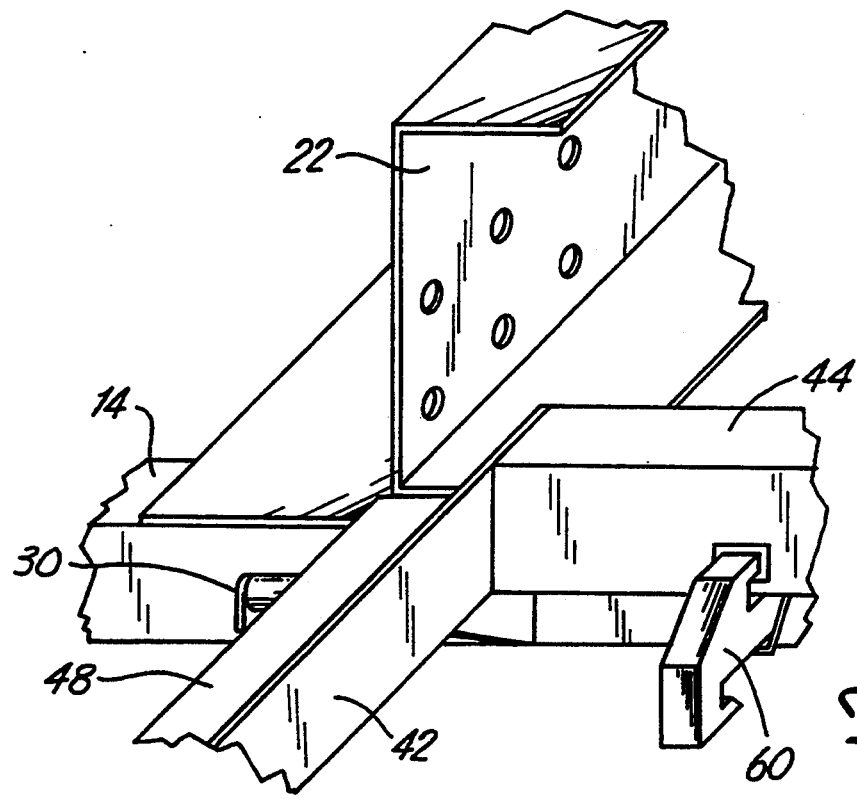
FIG. 9 is a perspective detail view similar to FIG. 8 illustrating the relationship of the first and second rail means when the second rail means is in its deployment position.

In a particularly preferred embodiment, best seen in FIGS. 8 and 9, the brackets 22 are disposed above the upper surfaces of the cross bars 14, defining a gap 24 therebetween. As explained hereinbelow, this permits the second rail means to cooperate with the first rail means to define an elongate rail for moving the platform 100 between a forward position disposed above the bed of the vehicle V and a rearward position wherein the platform is disposed generally rearwardly of the vehicle. This gap may be defined by use of a piece of angle iron 26, with a cross bar 14 being attached to one leg of the angle and a bracket 22 attached to the other leg. The angle iron 26 may be rigidly affixed to the cross bar and bracket by welding, as illustrated in FIGS. 8 and 9, or it may be rigidly attached to either the cross bar or the bracket and releasably attached to the other of these two elements, as is the case of the adjustable frame shown in FIG. 7 and described above.

As noted above, the first rail means 20 comprises a pair of opposed, generally C-shaped brackets 22. These brackets are sized to receive and support a wheel 110 of the platform 100 as the platform is moved along the rail means, as described more fully below. The brackets 22 are laterally spaced apart from one another and the open ends of the C-shaped brackets face one another. This defines a track along which a pair of wheels 110 along a common axle 112 may ride, with the space between the brackets being slightly greater than the length of the axle to permit free sliding of the platform, but not so far apart as so allow the wheels to slip out of the channels of the brackets 22.

A system of the invention for loading and unloading recreational vehicles also includes a second rail means 40 sized and shaped to cooperate with the first rail means 20. This second rail means is movable between a first position for storage wherein it is disposed generally above the bed of the vehicle V (illustrated in FIG. 1) and a second deployment position wherein it extends generally rearwardly of the frame 10 and the bed of the vehicle (illustrated in FIGS. 2-4).

As best seen in FIGS. 7-9, the second rail means 40 desirably comprises a pair of opposed, generally L-shaped rails 42 connected to one another by at least one strut 44. The rails preferably face away from one another, i.e. the generally horizontal bottom portions 48 of the L-shaped rails are oriented away from one another. The length of the rails may be varied as necessary, but the rails are optimally about as long as the brackets 22 of the first rail means. This permits the rails to be stored immediately adjacent the brackets 22, yet avoids having the second rail means form too steep of an incline when lowered for removing the recreational vehicles from the platform 100.

In a preferred embodiment, the second rail means includes two struts, with one strut disposed adjacent each end of each rail and extending between adjacent ends of opposite rails. The struts may be of any desired shape which can rigidly connect the rails to one another in a fixed relationship; a square tube having of about 1.5 inches in width formed of steel or the like should suffice. If so desired, a plurality of trestle members 46 can extend between and be connected to opposite rails. In order to avoid any interference with movement of the second rail means during deployment, such trestle members should be spaced away from the bottom edge of the rails; sheet metal about one-half inch in height and attached adjacent the top of the rails should provide adequate support and clearance. A handle (or handles) 47 may be attached to the strut adjacent the rearward end of the rails to assist an operator in retracting the second rail means, as outlined below.

The space between the two rails 42 should be sufficient to allow most of the second rail means to be disposed between the brackets 22 of the first rail means. In particular, the rails should be spaced apart a sufficient distance such that the generally vertical, inner portion of each L-shaped rail should be adjacent a bracket 22 of the first rail means, with at least a portion of the horizontal leg 48 of the rail being disposed beneath the bracket in the gap 24 between the bracket and the cross bar 14. The vertical legs of the rails should not be spaced far enough apart to be urged against the inner edges of the brackets and cause undue friction between these elements as such friction will impede the smooth sliding of the second rail means during deployment. Similarly, the gap 24 should be large enough to permit the horizontal leg 48 of the rail to move freely to avoid restricting the second rail means.

As previously noted, the first rail means 20 desirably comprises a pair of opposed, generally C-shaped brackets 22 with the open edges of the brackets facing toward one another and the second rail means 40 desirably comprises a pair of opposed, generally L-shaped rails 42 which face away from one another. As best seen in FIGS. 8 and 9, the open edge of a bracket 22 of the first rail means faces an associated rail 42 of the second rail means to define a channel bounded on four sides (three sides are bounded by the C-shaped bracket and the fourth, inner side is bounded by the generally vertical leg of the rail). As explained below in connection with the structure of the platform 100, the wheels 110 of the platform can move freely within these channels, but generally cannot slip out of the channel because it is bounded on all sides.

FIG. 8 depicts the second rail means 40 in its storage position wherein it is positioned generally above the bed of the vehicle V (FIG. 7 shows the second rail means in generally the same position). When in this position, the entire length of the horizontal leg 48 of each rail is optimally received within the gap 24 associated with the adjacent bracket 22 of the first rail means. The rails may therefore simply rest upon the tops of the cross bars 14 of the frame. For reasons explained below, a roller 30 is desirably carried by the frame adjacent a rearward end of each bracket 22 and may be positioned on a level slightly below that of the bottom of the adjacent bracket. In such a configuration, the roller 30 may serve as a stop to prevent the rails 42 from sliding rearwardly out of the gap 24 when the vehicle V is in transit.

In a particularly preferred embodiment of the invention, though, at least one latch 60 is attached to the frame 10 adjacent its rearward end. This latch may be attached to the rear surface of the rearmost cross bar 14 of the frame and is adapted to engage the rear strut 44 of the second rail means 40 when the second rail means is in its retracted storage position. This latch is desirably spring-biased into an upward position for engaging the strut 44, but can be moved out of engagement when it is desired to deploy the second rail means.

Figure 10:
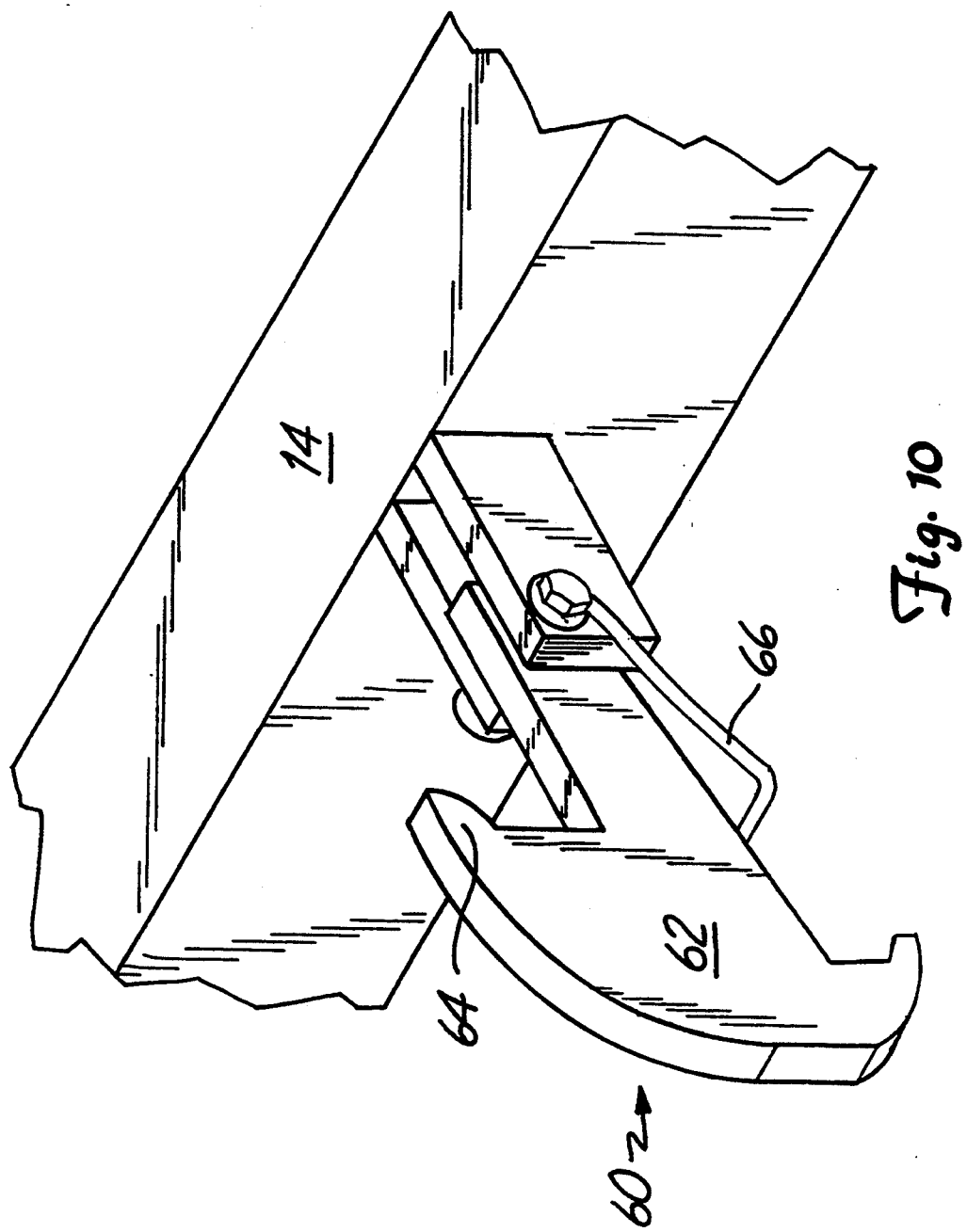
FIG. 10 is a perspective detail of a latch for engaging the second rail means.

As best seen in FIG. 10, this latch may include an arm 62 which is pivotally connected to the cross bar 14 of the frame. The arm may include a finger 64 at its outward end and this finger may be sized to fit into a recess in the strut 44 of the second rail means. A spring 66 can act against the arm 62 to urge it upwardly into engagement with the second rail means, but permit the latch to be pivoted downwardly away from the second rail means when desired.

When it is desired to deploy the second rail means by retracting it rearwardly, the latch 60 may be pivoted out of engagement with the rear strut 44 and the second rail means may be lifted upwardly and rearwardly via the handle 47 to place the bottoms of the horizontal legs 48 of the rails on top of their associated rollers 30. In the embodiment shown in FIGS. 8 and 9, the second rail means should be lifted up before pulling it backward in order to ensure that the rails 42 will clear the roller. The gap 24 between the bottom of the brackets 22 and the tops of the cross bars 14 should be wide enough to enable the rails 42 to be lifted within the gap to clear the roller and to provide sufficient clearance between the rails and the bottoms of the brackets to avoid undue friction between these parts.

The second rail means 40 may then be retracted with the bottoms of the rails sliding along the rollers until the latch 60 engages the forward strut 44 of the second rail means. The latch will automatically engage the forward strut as it will tend to pivot upwardly under the bias of the spring 66 after clearing the rear strut. This prevents the user from inadvertently pulling the second rail means back too far and completely disengaging the second rail means from the frame 10. When the second rail means is fully deployed, the rails 42 should just clear the rearward edges of their associated brackets 22 and the rails will be supported adjacent their forward ends by the rollers 30. As depicted in FIG. 9, the second rail means will tend to be inclined generally downwardly in a rearward direction.

As noted above, the system of the invention includes support means 70 for supporting the second rail means above the ground. The support means may be of any design which will permit the second rail means to be raised and lowered between an inclined deployed position (illustrated in FIGS. 4 and 9) and a generally horizontal deployed position (illustrated in FIGS. 2 and 3); two suitable designs are shown in the attached drawings.

Figure 2:
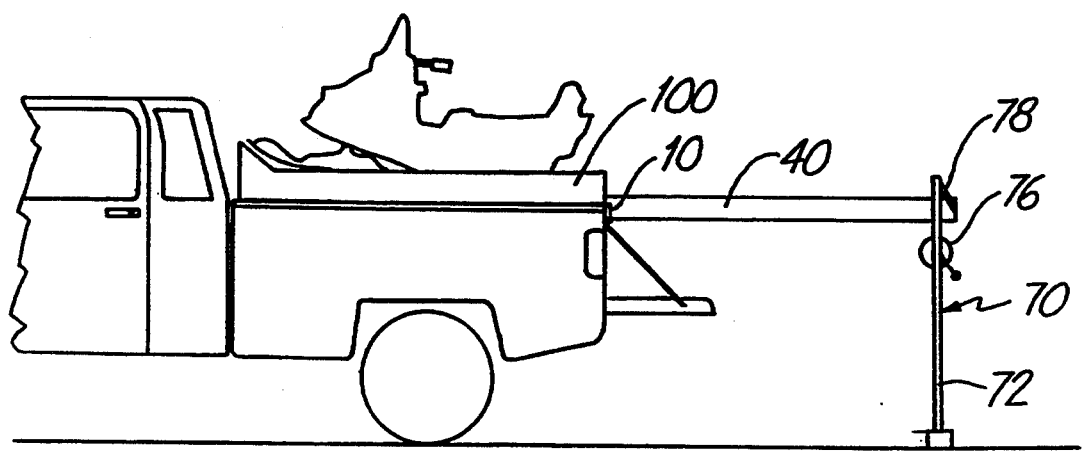
Figure 3:
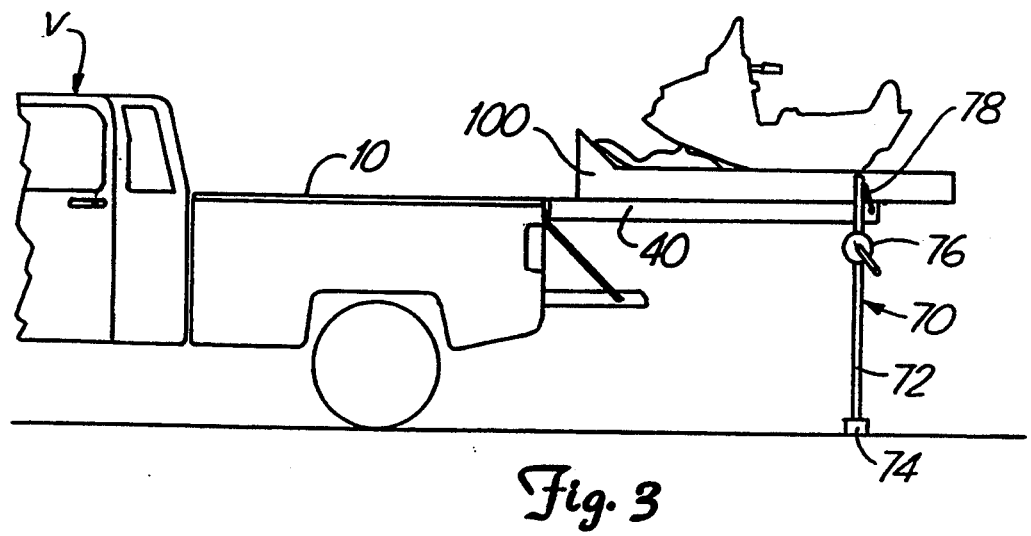
Figure 4:
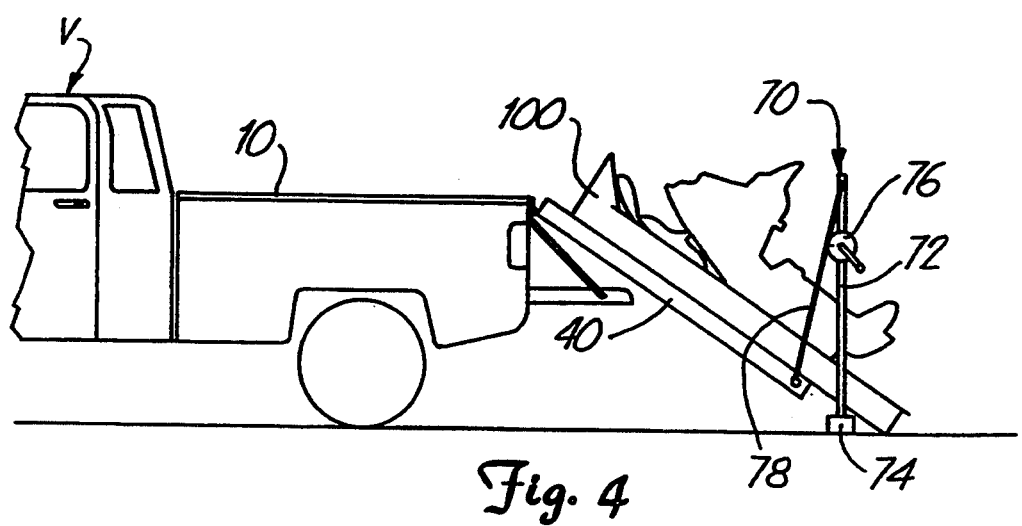

In the embodiment of FIGS. 2-4, the support means 70 comprises a pair of spaced-apart poles 72 (only one of which is visible in the side views shown in these figures). The lower ends of the poles rest on the ground and are desirably provided with feet 74 for supporting the pole in a generally vertical orientation. These feet may take the form of a block (as shown), a tripod of collapsible legs, or any other design which will stably support the poles on uneven ground. The support means 70 of this embodiment also includes a pulley system with a cable 78 attached to the second rail means adjacent its rearward end. The cable may be retracted to raise the second rail means or let out to lower the second rail means. A take-up reel 76 may be used to retract and let out the cable. Although the take-up reel is shown with a manual crank, it should be understood that a small electric motor or the like may be provided to turn the reel.

In a preferred embodiment, each of the two poles 72 carries a cable and the two cables are attached to opposite sides of the second rail means. The system of the support means (not shown) is desirably arranged so that turning of a single take-up reel 76 carried by one pole will move the cables of both poles to raise or lower both sides of the second rail means at the same time.

The poles 72 may be entirely detachable from the rest of the system and are advantageously sized to fit in the space between the bottom of the frame 10 and the floor of the bed of the vehicle V. (This space is best seen in FIG. 5.) When the second rail means has been deployed as described above, the poles may be positioned adjacent the rearward end of the second rail means, with one pole being disposed adjacent either side of the second rail means 40. The cables may then be attached to the second rail means and the second rail means can be lifted into a generally horizontal position, as depicted in FIG. 2.

In an alternative embodiment shown in FIG. 11, wherein parts having like functions bear like reference numerals but including primes ('), the support means 70' comprises at least one, and desirably two, scissor jacks 72' of the type commonly used in automobile jacks. If two such jacks are used, they may be connected to one another adjacent their lower ends by a common actuating shaft 75'. A foot 74' is provided for each scissor jack and, if necessary to avoid stressing the scissor jacks, the scissor jack may be pivotally mounted on its foot to allow the second rail means to move through an arc as it pivots about the roller 30 when it is raised and lowered. These scissor jacks can remain attached to the second rail means and can be stored hanging from the bottom of the second rail means in a collapsed configuration. The actuating shaft may be turned by means of a crank 76', which may be manually activated by a ratcheting lever or the like, as shown, or by a small electric motor or other automated means.

The present invention also includes a platform, designated generally as 100. This platform includes a generally flat floor 102 upon which one or more recreational vehicles may rest. This floor can be formed of steel sheet stock or other material which can adequately bear the weight of the recreational vehicle(s). In a preferred embodiment, the floor is relatively large, e.g. about 8 feet by about 8 feet, so that more than one recreational vehicle can be loaded onto the vehicle V at one time. Whereas only one snowmobile or similarly sized vehicle can be stored flat on the floor of a standard pickup bed, providing a larger platform can permit two such recreational vehicle to be hauled with a single transport vehicle V. If the floor 102 is larger than the bed of the vehicle V, it will be necessary to allow the floor to extend laterally beyond the sides of the vehicle, as illustrated.

The platform 100 may be provided with sidewalls 104 which extend upwardly along three of the four edges of the floor. Although not deemed necessary, such sidewalls can help keep the recreational vehicles from sliding off the platform during transit. Recreational vehicles may also be lashed down using cables (not shown) attached to the floor to further limit the chances of having the vehicles fall off. Manually graspable handles 106 can be included to permit the platform to be moved along the rail means as disclosed below.

The platform is carried on and slidable along the first and second rails means by wheels 110. The wheels 110 are arranged in pairs, and a common axle 112 may extend between paired wheels. Although a single pair of wheels on a single axle could be used, the platform will be more stable and easier to deploy with recreational vehicles thereon if two or more sets of wheels are used.

The axle 112 can be attached to the underside of the floor by means of blocks 114 having ports therethrough.

The wheels are adapted to ride along the first and second rail means. The wheels should therefore be sized to be loosely received within the C-shaped brackets 22 of the first rail means. The wheel is preferably narrow enough to ride along the lower portion of a bracket without extending too far inwardly. If the wheel were too wide, it would tend to rub against either the inner face of the bracket 22 or the outer face of the rail 42.

As noted above, when the second rail means is in its storage position, the brackets and the rails combine to define a channel along which the wheels must travel and this channel is bounded on all four sides. However, when the second rail means extends rearwardly behind the frame and the vehicle, the C-shaped brackets 22 will be inwardly open. In order to prevent the platform from shifting laterally sufficiently to allow the wheels to fall out of the bracket, a stop plate 116 may extend downwardly from the bottom of the floor adjacent each wheel. The stop plate should be positioned just inwardly of the wheel. This stop plate will abut the top leg of the adjacent bracket 22 before the platform can shift far enough to permit the wheel from falling off of the bracket.

The space between paired wheels 110 and the space between the rails 42 of the second rail means should be selected to ensure that the wheels will not fall off the horizontal leg 48 of the L-shaped rails when travelling along the second rail means in its deployed position behind the frame. If the space between the wheels is only slightly greater than the space between the vertical legs of the rails, the wheels will abut the inner face of one of the rails before the platform can shift far enough laterally to allow the wheels to fall off the horizontal leg of the rails.

The system should include locking means for preventing the platform from sliding out of the channel defined by the brackets 22 and rails 42 during transit. This locking means may take the form of a locking bar 120 which is receivable within a pair of opposed slots (not shown) in the brackets 22 and can be secured in a position extending between these brackets. This locking bar may be positioned so that it will abut the platform, e.g. the stop plate 116, to prevent unwanted sliding, but should be located so as to avoid any significant interference with the movement of the rails 42. This locking bar can be removed when the platform is to be moved for loading or unloading recreational vehicles.

The method of the present invention allows one to use a system substantially as described above to safely and easily load a recreational vehicle onto a transport vehicle V. FIGS. 1-4 schematically illustrate the sequence of steps in unloading a recreational vehicle in accordance with the invention. FIG. 1 shows the platform 100 with one or more recreational vehicles on the floor 102 of the platform disposed. In this figure, the platform is in its forward position wherein it is disposed above the bed of the transport vehicle V. The platform will most commonly be in this forward position during transit or storage of the recreational vehicles. As noted above, the platform is desirably locked in this forward position by a locking means, e.g. the locking bar 120, to prevent the platform from prematurely sliding off the frame.

When a desired unloading site is reached, the second rail means 40 is withdrawn rearwardly of the frame 10 and the vehicle V. As explained previously, the second rail means will then tend to be inclined downwardly away from the frame as the rearward end of the rails 42 are not supported at this time. The second rail means 40 may then be raised by the support means 70 into a generally horizontal position, as shown in FIG. 2, by pivoting the second rail means about the pivotable support of the rollers 30. In this position, the forward end of the second rail means is adjacent the rearward end of the first rail means.

Hence, at least on ground which is generally horizontal rather than inclined, the first rail means and second rail means together function as a single elongate rail mechanism which extends generally horizontally from a position disposed above the bed of the vehicle V to a position disposed well behind the vehicle. (If the recreational vehicles are being unloaded on an incline, it may be desirable to have an angle between the brackets and the adjacent rails so that the rails will be oriented generally horizontally in an absolute sense.)

Once the second rail means is properly positioned, the user may slide the platform generally rearwardly to its second position wherein it is disposed generally rearwardly of the frame 10 and the vehicle V and is supported above the ground by the second rail means; this is the position depicted in FIG. 3. Since the second rail means are desirably generally horizontal and the platform rides along the rail means on wheels, moving the platform from its forward, storage position and its rearward, deployment position is relatively easy and can be accomplished by virtually any user.

The second rail means 40 can then be lowered in a controlled fashion to incline both the second rail means and the platform 100 resting thereon downwardly in a rearward direction, as shown in FIG. 4. The snowmobiles or other recreational vehicles can then be removed from the platform by simply driving them off. If the present invention is being used to load and unload personal watercraft or the like which require water for propulsion, at least the foot 74 of the support means 70 is desirably positioned in the water. This will place a rearward portion of the platform adjacent, if not in, the water so that the vehicles may be removed from the platform under their own power.

The sequence of events for loading recreational vehicles onto a transport in accordance with the invention is generally the reverse of the sequence for unloading the vehicles. The recreational vehicle may be driven up the ramp defined by the platform 100 until it is squarely positioned on the floor 102 thereof. This process is easier than using a conventional ramp because the vehicle need only be driven up the ramp a short distance. The problems associated with steering or propulsion of recreational vehicles up ramps and into beds of transport vehicles are therefore minimized.

The second rail means may then be raised by the support means 70 to the generally horizontal position shown in FIG. 3. As noted above, this can be done by means of a pulley system, scissor jacks or other means which can be run by a motor or will at least provide significant mechanical advantage to the user to make it easier to lift the weight of the platform 100 and the recreational vehicle or vehicles thereon. The platform can then be slid forward along the elongate rail mechanism defined by the cooperating first and second rail means until the platform is hi its forward position disposed generally above the bed of the vehicle V. (See FIG. 2.)

The second rail means 40 may then be pushed back toward the front of the frame 10 and the vehicle V. The second rail means should be pushed in far enough that it will be safely locked in its forward storage position. As explained above, a latch means 60 may be provided for locking the second rail means in this position. The platform 100 can then be locked in place and the system is ready for transit. (See FIG. 1.)

While a preferred embodiment of the present invention has been described, it should be understood that various changes, adaptations and modifications may be made therein without departing from the spirit of the invention and the scope of the appended claims.

What is claimed is:

1. A system for loading and unloading a recreational vehicle onto a transport vehicle comprising:
   a) a frame member affixed to the transport vehicle, the frame member including first rail means;
   b) second rail means cooperating with the first rail means, the second rail means being moveable along the first rail means from a storage position to a deployment position wherein the second rail means extend rearwardly of the frame;
   c) support means carried adjacent a rearward end of the second rail means, the support means being moveable relative to said second rail means between a storage position and a support position wherein the support means extends supportively between the second rail means and the ground; and
   d) platform means slidable along the first and second rail means between a first position wherein the platform means is disposed above a bed of the transport vehicle and a second position wherein the platform means is disposed rearwardly of said bed.

2. The system of claim 1 wherein the second rail means is pivotally connected to the first rail means, the second rail means being pivotable from a substantially horizontal orientation for sliding the platform means and an inclined orientation wherein the second rail means extends from a forward end adjacent the first rail means and a rearward end adjacent the ground.

3. The system of claim 2 wherein said support means further comprises mechanical lifting means for moving the second rail means between its substantially horizontal orientation and its inclined orientation.

4. A method of unloading a recreational vehicle from a transport vehicle comprising the steps of:
   a) providing a frame member affixed to the transport vehicle and including first rail means, second rail means movable from a storage position and a deployment position, support means movable from a storage position and a support position, and platform means slidable along said first and second rail means;
   b) moving the second rail means to its deployment position wherein the second rail means extends rearwardly of the frame member;
   c) moving the support means into its support position so that the support means extends from the second rail means to the ground to support the second rail means;
   d) sliding the platform rearwardly along said first and second rail means to a position wherein the platform is disposed generally rearwardly of the transport vehicle;
   e) lowering a rearward end of the second rail means so that the second rail means extends between a forward end adjacent the first rail means and rearward end adjacent the ground.

5. The method of claim 4 wherein the second rail means is pivotally connected to the first rail means, wherein the second rail means is pivoted about said pivotal connection to lower the rearward end of the second rail means.

6. The system of claim 1 wherein the support means has an adjustable length.

7. The system of claim 6 wherein the support means comprises a jack, further comprising a crank operatively connected to the jack for extending or lowering the jack.

8. The system of claim 1 wherein the support means comprises a pair of spaced-apart poles releasably attached to the second rail means.

9. The system of claim 8 further comprising a cable and a pulley attached to the poles and being adapted to raise or lower a rearward end of the second rail means.

10. The system of claim 9 wherein the poles are attached to the second rail means by a length of the cable and the platform is free to move vertically with respect to the poles.

* * * * *